US010845468B2

(12) United States Patent
Marron

(10) Patent No.: US 10,845,468 B2
(45) Date of Patent: *Nov. 24, 2020

(54) COHERENT LADAR USING INTRA-PIXEL QUADRATURE DETECTION

(71) Applicant: Raytheon Company, Waltham, MA (US)

(72) Inventor: Joseph Marron, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 273 days.

This patent is subject to a terminal disclaimer.

(21) Appl. No.: 15/887,842

(22) Filed: Feb. 2, 2018

(65) Prior Publication Data

US 2018/0172806 A1    Jun. 21, 2018

Related U.S. Application Data

(63) Continuation of application No. 14/643,719, filed on Mar. 10, 2015, now Pat. No. 10,000,000.

(51) Int. Cl.
*G01S 7/48* (2006.01)
*G01S 7/4863* (2020.01)
(Continued)

(52) U.S. Cl.
CPC .......... *G01S 7/4863* (2013.01); *G01S 7/4865* (2013.01); *G01S 7/4914* (2013.01); *G01S 7/4917* (2013.01); *G01S 13/89* (2013.01)

(58) Field of Classification Search
CPC ...... G01J 3/45; G01J 3/453; G01J 3/44; G01J 3/28
See application file for complete search history.

(56) References Cited

U.S. PATENT DOCUMENTS 5,093,563 A * 3/1992 Small ............... G02B 27/58
250/201.9
5,565,982 A * 10/1996 Lee .................. G01J 3/2889
250/458.1
(Continued)

FOREIGN PATENT DOCUMENTS

CN    101034161 A    9/2007
JP    S63-009877 A    1/1988
(Continued)

OTHER PUBLICATIONS

"Notice of Reason(s) for Rejection," Japanese Patent Office, Japanese Patent Application No. JP 2017-561614, dated Mar. 5, 2019, 10 pages.

(Continued)

*Primary Examiner* — Luke D Ratcliffe

(57) ABSTRACT

A frequency modulated (coherent) laser detection and ranging system includes a read-out integrated circuit formed with a two-dimensional array of detector elements each including a photosensitive region receiving both return light reflected from a target and light from a local oscillator, and local processing circuitry sampling the output of the photosensitive region four times during each sample period clock cycle to obtain quadrature components. A data bus coupled to one or more outputs of each of the detector elements receives the quadrature components from each of the detector elements for each sample period and serializes the received quadrature components. A processor coupled to the data bus receives the serialized quadrature components and determines an amplitude and a phase for at least one interfering frequency corresponding to interference between the return light and the local oscillator light using the quadrature components.

20 Claims, 6 Drawing Sheets

(51) Int. Cl.
    *G01S 7/4914* (2020.01)
    *G01S 13/89* (2006.01)
    *G01S 7/4912* (2020.01)
    *G01S 7/4865* (2020.01)

(56) References Cited

U.S. PATENT DOCUMENTS

| | | | |
|---|---|---|---|
| 5,751,830 | A | 5/1998 | Hutchinson |
| 10,000,000 | B2 * | 6/2018 | Marron .................. G01S 13/89 |
| 2003/0076485 | A1 | 4/2003 | Ruff et al. |
| 2006/0227316 | A1 | 10/2006 | Gatt |
| 2006/0227317 | A1 | 10/2006 | Henderson et al. |
| 2013/0104661 | A1 * | 5/2013 | Klotz ...................... G01H 9/00 73/657 |

FOREIGN PATENT DOCUMENTS

| | | |
|---|---|---|
| JP | H10-332329 A | 12/1998 |
| JP | 2001324563 A | 11/2001 |
| JP | 2005-214927 A | 8/2005 |
| JP | 2008537116 A | 9/2008 |
| JP | 2012-002619 A | 1/2012 |
| JP | 2013-257302 A | 12/2013 |
| WO | 2005080928 A1 | 9/2005 |
| WO | 2006/113295 A1 | 10/2006 |
| WO | 2014/203654 A1 | 2/2017 |

OTHER PUBLICATIONS

"Notice of Reason(s) for Rejection," Japanese Patent Office, Japanese Patent Application No. JP 2017-561614, dated Aug. 14, 2018, 9 pages.

Notification of Transmittal of the International Search Report and the Written Opinion of the International Searching Authority, or the Declaration dated Jun. 9, 2016 in connection with International Patent Application No. PCT/US2016/019088.

Li; "Time-of-Flight Camera—An Introduction"; Texas Instruments White Paper; SLOA190B; Jan. 2014; revised May 2014; 10 pp.

Marron, et al.; "Coherent Detection with an Asynchronous Geiger Mode Array"; Proc. MSS Active Meeting, Washington, D.C.; 2014.

Marron et al., "Atmospheric turbulence correction using digital holographic detection: experimental results", Optics Express, vol. 17, No. 14, Jul. 6, 2009, p. 11638-11651.

Niclass, et al. "Single-Photon Synchronous Detection"; IEEE Journal of Solid-State Circuits; vol. 44, No. 7; Jul. 2009; 13 pp.

Communication pursuant to Article 94(3) EPC dated Jul. 15, 2019 in connection with European Patent Application No. 16 708 320.3, 5 pages.

Office Action dated Sep. 8, 2020 in connection with counterpart Japanese Patent Application No. 2019-144618, 13 pages.

* cited by examiner

COHERENT LADAR USING INTRA-PIXEL QUADRATURE DETECTION

PRIORITY CLAIM

This application is a continuation of U.S. Non-Provisional patent application Ser. No. 14/643,719 filed Mar. 10, 2015 and entitled COHERENT LADAR USING INTRA-PIXEL QUADRATURE DETECTION. The content of the above-identified patent document(s) is incorporated herein by reference.

TECHNICAL FIELD

The present disclosure is directed in general to laser detection and ranging, and, more particularly, to frequency-modulated laser detection and ranging.

BACKGROUND OF THE DISCLOSURE

Current approaches for obtaining the largest format detector arrays for frequency-modulated laser detection and ranging have involved increasing the number, size and/or complexity of amplifiers, analog-to-digital converters, and memories associated with the pixels of an array of high-bandwidth detectors. High digitization rates and the resulting large volumes of data that must be sent to a processor to compute the amplitude and phase of the return signal have limited array sizes and effectively precluded real-time operation.

There is, therefore, a need in the art for improved capture and handling of data employed for coherent laser detection and ranging.

SUMMARY OF THE DISCLOSURE

A frequency modulated (coherent) laser detection and ranging system includes a read-out integrated circuit formed with a two-dimensional array of detector elements each including a photosensitive region receiving both return light reflected from a target and light from a local oscillator, and local processing circuitry sampling the output of the photosensitive region four times during each sample period clock cycle to obtain quadrature components. A data bus coupled to one or more outputs of each of the detector elements receives the quadrature components from each of the detector elements for each sample period and serializes the received quadrature components. A processor coupled to the data bus receives the serialized quadrature components and determines an amplitude and a phase for at least one interfering frequency corresponding to interference between the return light and the local oscillator light using the quadrature components.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
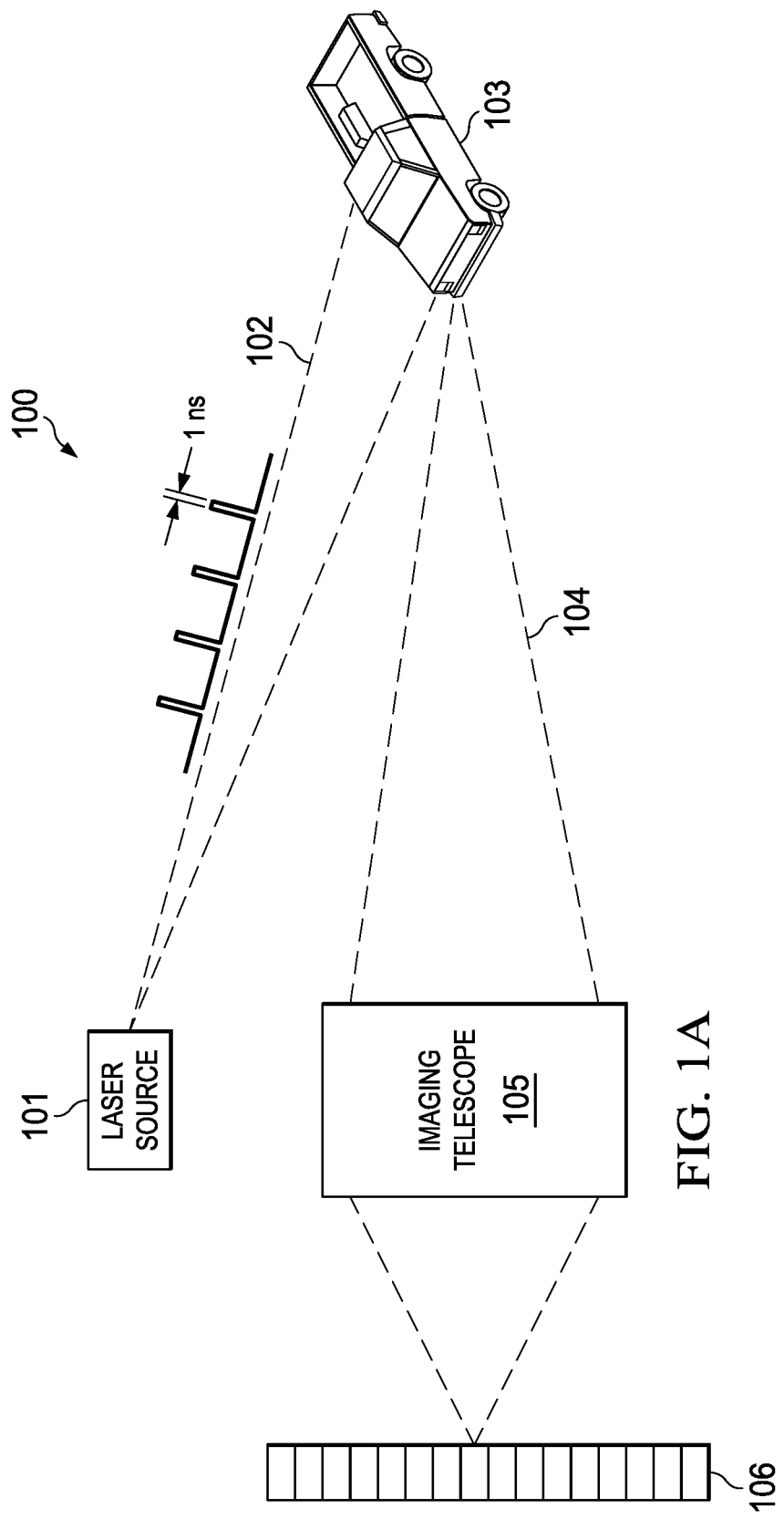
FIGS. 1A, 1B and 1C diagrammatically illustrate operation of, respectively, a pulsed LADAR system typically employed for long-range 3D imaging, an AM LADAR system typically used for shorter range applications, and an FM LADAR system based on frequency modulation of a coherent laser source.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Additionally, unless otherwise specifically noted, articles depicted in the drawings are not necessarily drawn to scale.

Laser detection and ranging (LADAR) systems are the optical analog of radar systems, in which the target is illuminated with light from a laser source and the return is detected with an optical detector. The resulting signal from the optical detector is processed to determine information about the target, such as range or velocity.

LADAR applications are driven to some extent by component technologies. Laser sources include both diode lasers that are generally compact, efficient, and low-cost but only low power, and eye-safe lasers that operate at wavelengths greater than about 1.5 microns (µm) and enable long-range, free-space LADAR. Detectors are often array detectors, to reduce the requirement for beam scanning. Processors, because processing of LADAR data can be computationally intensive, must typically enable high-speed—and often real-time—LADAR imaging.

Two-dimensional arrays of coherent detectors are required for many advanced coherent laser detection and ranging (LADAR) systems. A conventional approach is to use an array of discrete high-bandwidth detectors each having an amplifier, analog-to-digital (A/D) converter and memory. The resulting large volume of data is then sent to a processor to compute the amplitude and phase of the return signal. The high digitization rates and large volumes of resulting data have limited array sizes to a small number of pixels (on the order of 10s of pixels). There is also typically a large time interval required to process the data so that real-time operation is not achieved.

LADAR systems may generally be grouped into three main categories: pulsed LADAR, in which the illuminating laser is pulsed and the detector records time-of-flight; amplitude modulated (AM) LADAR, in which the amplitude of the illuminating beam is sinusoidally modulated and the detector records phase of return amplitude modulation; and frequency modulated (FM) LADAR, in which the frequency and/or phase of the laser illumination is modulated, and the detector records the relative optical phase of the return signal. (Additionally, some LADAR systems use the parallax effect, which is not considered in this disclosure.) All three categories of LADAR systems are used in various application-dependent environments, typically with use of pulsed LADAR for long range mapping, AM modulated LADAR for short range three dimensional (3D) imaging, and FM modulated LADAR for interferometry, frequency domain optical coherence tomography, and synthetic aperture imaging.

FIG. 1A diagrammatically illustrates operation of a pulsed LADAR system 100 typically employed for long-range 3D imaging. A laser source 101 emits pulsed light 102 illuminating a distant target 103. The laser 101 is ideally an eye-safe, high pulse repetition frequency (PRF) emitting pulses on the order of 1 nanosecond (ns) duration, and high pulse energy device enabling long range, large field-of-view operation by the system 100. A return part 104 of the light 102 reflecting off the target 103 and reaching an imaging telescope 105 is focused by the imaging telescope 105 onto a two dimensional (2D) detector array 106 comprising M×N pixels. The detector array 106 records return time (time-of-flight) on a per-pixel basis, with the output of the detector array 106 processed by a processor (not shown separately in FIG. 1A) capable of handling high data and throughput rates to determine relative timing of return signals at different pixels and produce a 3D image. Implementing a detector array with sufficient timing resolution is a challenging design issue for this type of system. The detector array 106 should preferably comprise detector pixels that incorporate high-speed detection and local processing, to achieve fine timing-resolution detection and reduce the volume of data sent from the detector array to the processor. Some imaging detector arrays convert optical intensity into a serialized (raster scanned) analog signal, with an analog-to-digital (A/D) converter with memory (e.g., a frame-grabber) used to capture the data before transferring the data to a processor. 2D detectors generally incorporate digital processing into each pixel and the associated detector readout circuit, which is enabled by modern, fine-detail integrated circuit fabrication processes and which forms a digital readout integrated circuit (ROIC). Applications of digital ROIC technology are especially useful for improving data quality or reducing the volume of data. Advanced infrared (IR) detectors use digital ROICs with A/D conversion incorporated into the pixels to enhance dynamic range. LADAR systems use digital ROICs for fine resolution timing of return signals, to determine the temporal location of peak return rather than digitizing the entire temporal signal.

Another aspect of pulsed LADAR systems is that for long-range operation, high-sensitivity detector elements such as avalanche photo diodes (APDs) are required. In this regime, the photonic nature of the light must be considered, such that APDs are adjusted to operate in high-gain, Geiger-mode (GmAPDs). The analog signal from a GmAPD is series of temporal pulses caused by one or more of: photo-events from the return signal (shot-noise); spontaneous photo-events from dark noise (dark counts); photo-events from background light (background counts); and photo-events triggered by other events (ghosts). There can also be intra-pixel cross talk within an array of GmAPDs. Nonetheless, an array of GmAPDs with a digital ROIC is naturally well-suited for pulsed LADAR, since a GmAPD array records only time-stamps corresponding to sparse photo-events rather than digitizing temporal intensity signal and high PRF lasers allow averaging over multiple pulses to reduce impact of noise. In the photon-limited regime, the photo-sensitive detector is typically a GmAPD array with an ROIC that records arrival times for photo-events.

Figure 1B:
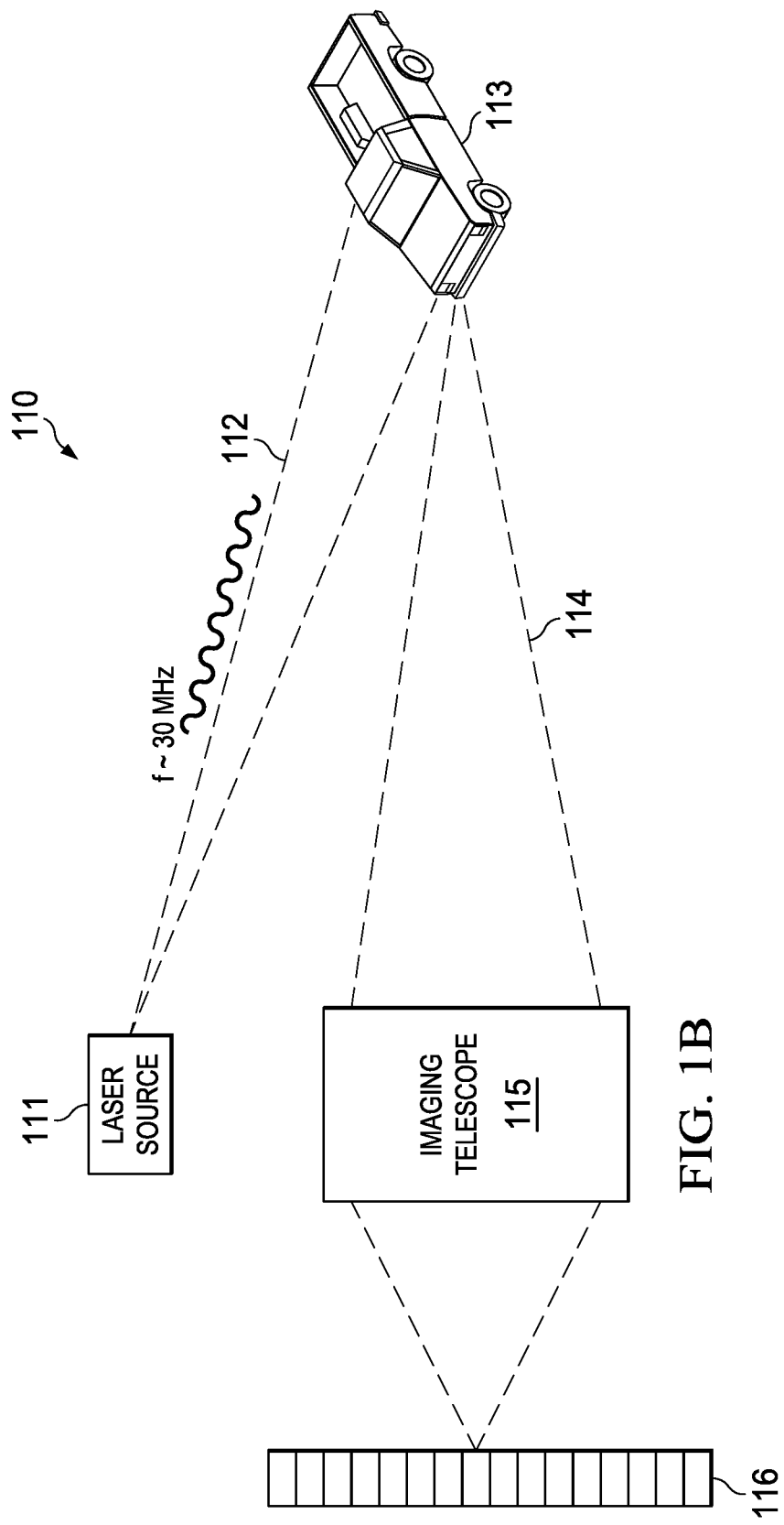

FIG. 1B diagrammatically illustrates operation of an AM LADAR system 110 typically used for shorter range applications. The laser source 111 in this implementation provides AM modulated light 112. The relative phase of the return signal 114 focused by imaging telescope 115 on detector array 116 provides a relative 3D range over the target 113. A typical modulation frequency for the light 112 is on the order of 10s of mega-Hertz (MHz)(e.g., 30 MHz, which results in an ambiguity interval of 5 meters). AM LADAR systems are often configured as a scanning system, but more recent implementations use a detector array. For detector arrays, every pixel should be capable of independently determining the distance to the object based on light received at that pixel, in effect operating as a massively parallel laser illuminated detection and ranging (LIDAR) on a single integrated circuit. Each pixel should allow accurate measurement of the arrival time of the collected photons in order to be substantially immune to detector array surface defects that might otherwise adversely affect time of flight ranging. Single photon avalanche diode (SPAD) based GmAPD pixels in the detector array enable such accurate measurement. SPAD devices detect the incoming sinusoidally modulated light intensity as series of photo-events using a high speed clock cycled through four states (quadrature detection). Photo-events that occur during these separate clock states are accumulated for use in a detection process that utilizes a synchronous clock to determine a phase of the return signal based on the accumulated photo-events corresponding to the four clock states. The gaming and machine vision industries in particular have driven development of sophisticated AM LADAR detectors with photon-counting based synchronous detection, measurement of modulation quadrature values performed at the pixel level, and fabrication based on low cost complementary metal-oxide-semiconductor (CMOS) processes.

Figure 1C:
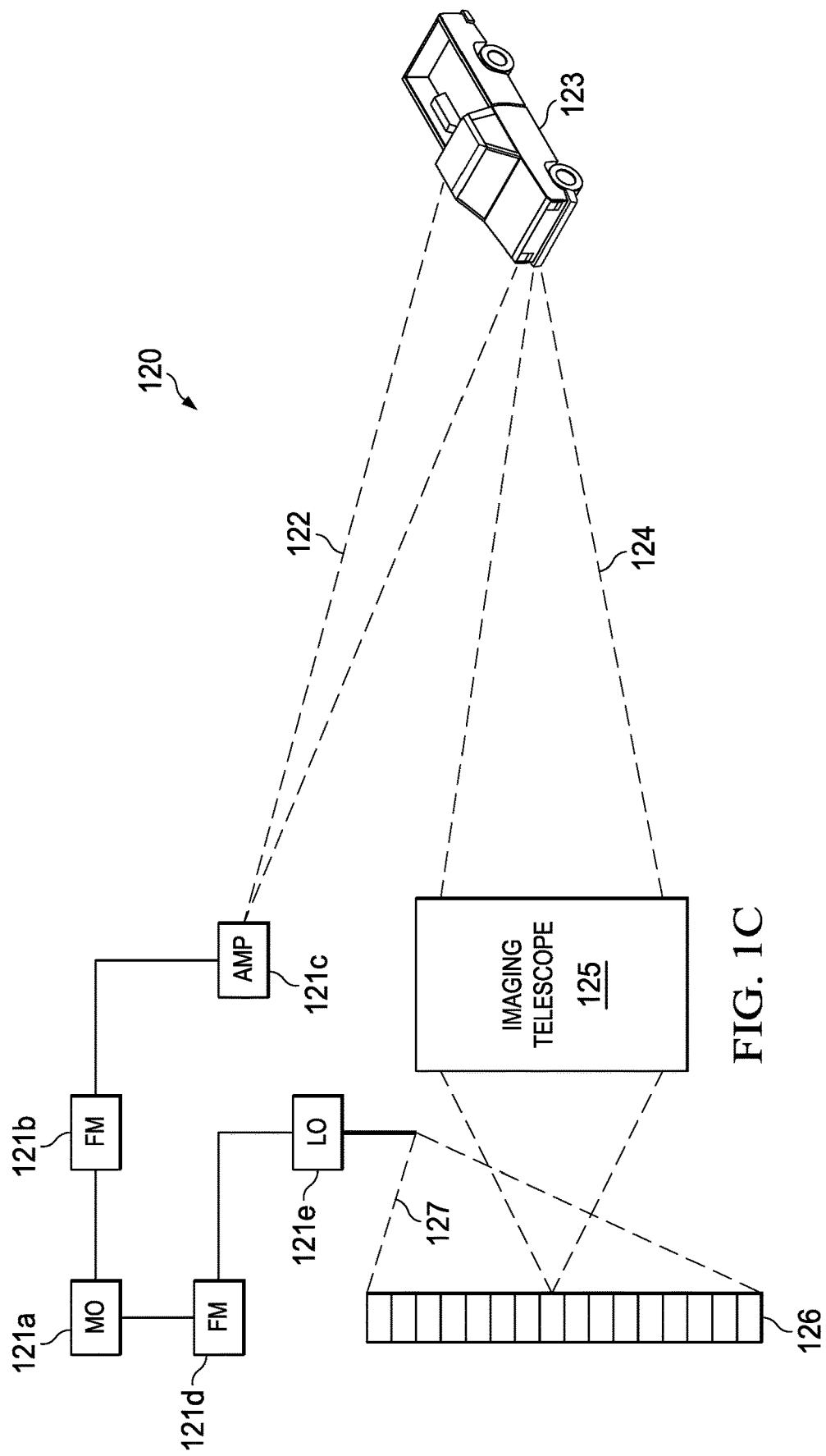

FIG. 1C diagrammatically illustrates operation of an FM LADAR system 120 based on frequency modulation of a coherent laser source. The laser source in this implementation includes a master oscillator (MO) 121a, a frequency modulator (FM) 121b, and an amplifier AMP) 121c producing the output 122 illuminating the target 123, and a second frequency modulator 121d receiving a signal from the master oscillator 121a together with a local oscillator (LO) 121e producing an output 127 illuminating the detector array 126. The target 123 is illuminated with coherent light 122 that originates from the master oscillator 121a and passes through the frequency modulator 121b and amplifier 121c. The return light 124 focused on the detector array 126 by the imaging telescope 125 interferes with light 127 from the local oscillator 121e, a frequency modulated beam derived from the master oscillator 121a. The amplitude and phase of the return signal 124 provide information about the target 123. The detector pixels detect a sinusoidally modulated interference signal—that is, the signal incident on the pixels results from coherent interference of the return beam 124 and the local oscillator beam 127. For the simple case of a frequency offset between the return and local oscillator beams, the resulting signal intensity detected by the pixels is:

$$I(t) = I_s + I_{LO} + 2\sqrt{I_s}\sqrt{I_{LO}} \cos(2\pi f t + \phi),$$

where $I(t)$ is the intensity of the signal received by a pixel within the detector array, $I_s$ is the intensity of the return light 124, $I_{LO}$ is the intensity of the local oscillator light 127, f is the interfering frequency, and $\phi$ is a phase shift between the return light 124 and the local oscillator light 127 at the interfering frequency f. A feature of FM detection is that the strength of the modulated signal is proportional to $\sqrt{I_s}\sqrt{I_{LO}}$, such that the signal is boosted by the local oscillator power.

In addition to being useful for long range detection, FM systems are also employed in interferometry.

Figure 2:
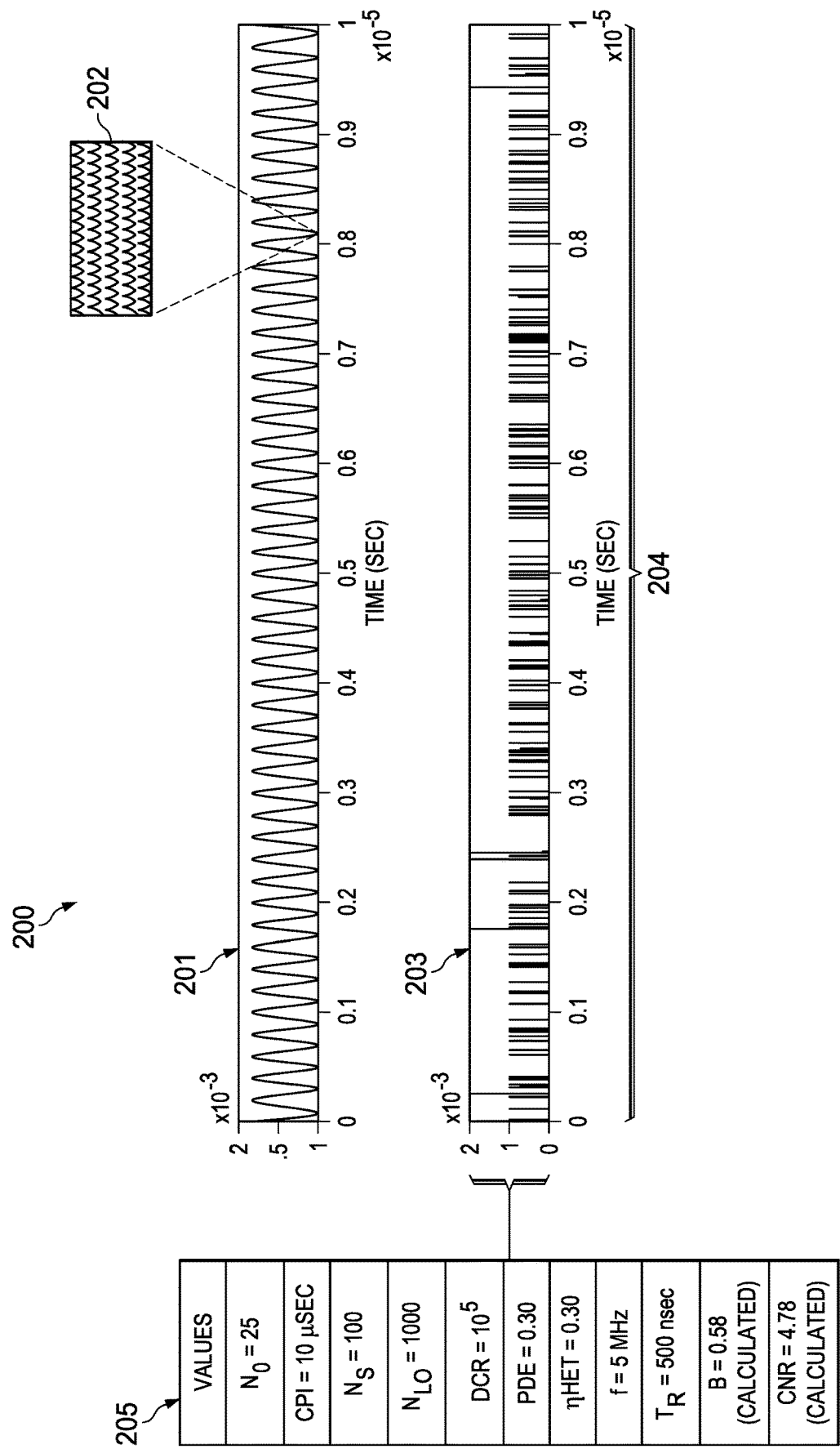
FIGS. 2 and 2A illustrate data processing associated with use of an FM LADAR system using GmAPD receivers in the detector array.
Figure 2A:
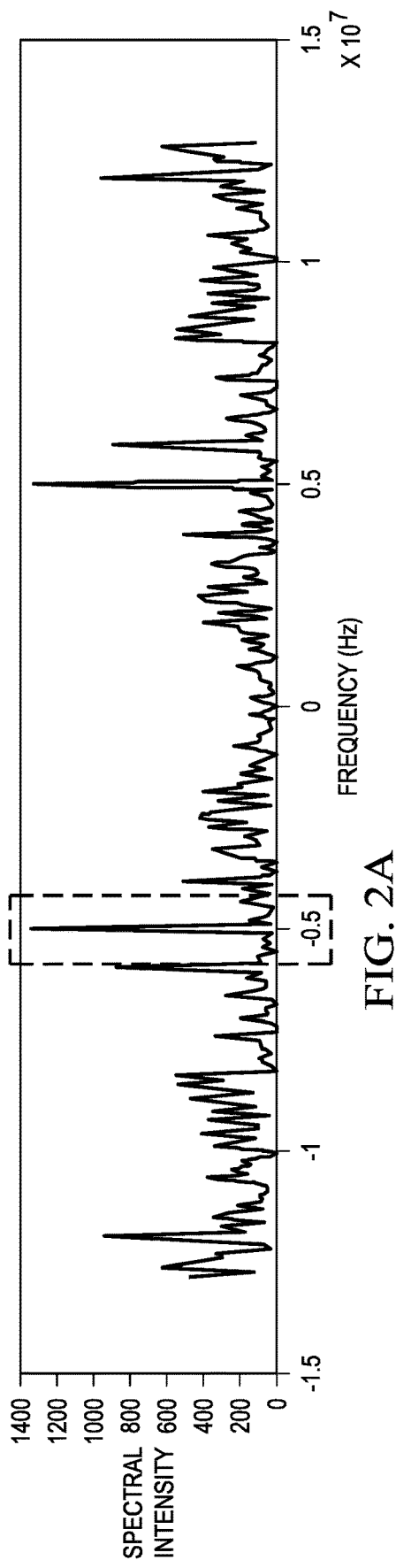

FIGS. 2 and 2A illustrate data processing 200 associated with use of an FM LADAR system using GmAPD receivers in the detector array. An intensity signal 201, derived from interfering return and local oscillator light signals 202, corresponds to photo-events 203. Processing of the photo-event sequence 204 yields target information, including values 205 such as those illustrated in the figure. To avoid saturation of the GmAPD detector, the local oscillator level is reduced. The signal intensity detected is:

$$I(t)=N_s+N_{LO}+N_{DCR}+2\sqrt{\eta_{HET}}\sqrt{I_s}\sqrt{I_{LO}}\cos(2\pi ft+\phi),$$

where $N_s$ is the number of signal photo-events, $N_{LO}$ is the number of local oscillator phot-events, $N_{DCR}$ is the number of dark counts, and $\eta_{HET}$ is heterodyne detection efficiency. A typical approach to implementing FM LADAR with GmAPD detector arrays has been to record a temporal sequence of phot-events and depicted in FIG. 2, then process the recorded events to compute a Fourier transform resulting in a frequency spectrum mapping of the events as illustrated in FIG. 2A to determine f and φ.

Figure 3:
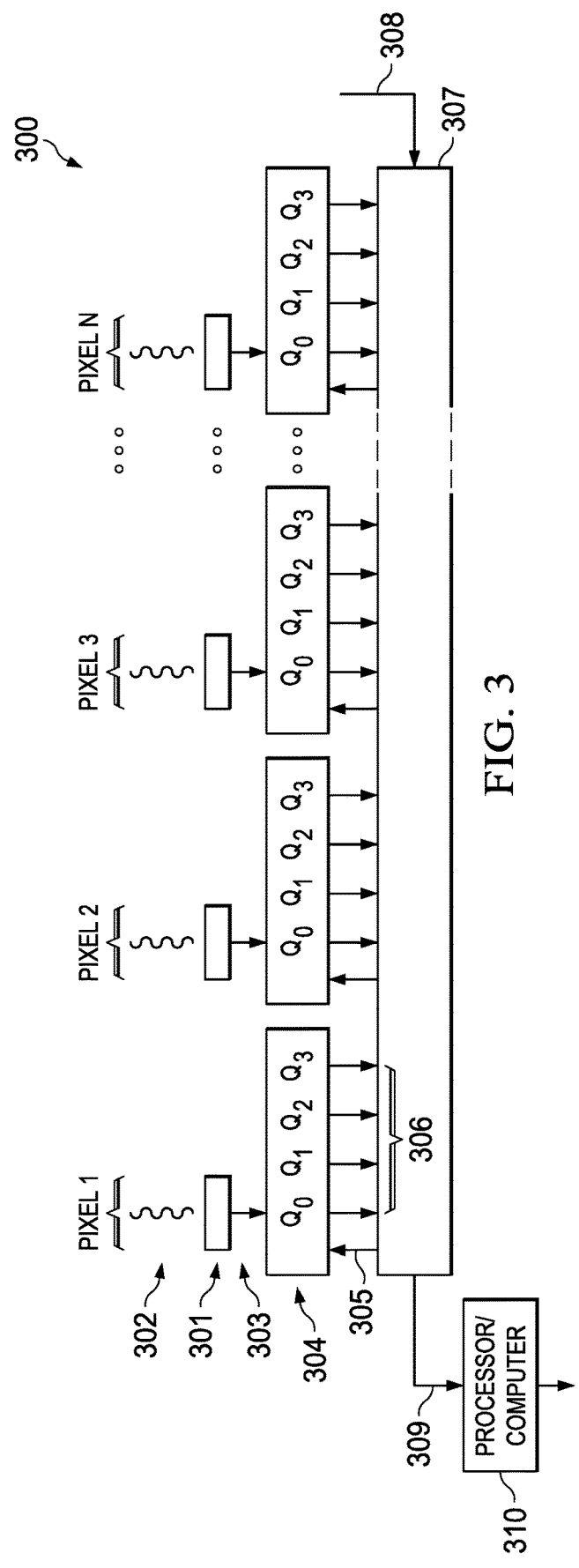
FIG. 3 is a block diagram illustrating synchronous coherent optical detection for FM LADAR in accordance with embodiments of the present disclosure.

FIG. 3 is a block diagram illustrating synchronous coherent optical detection for FM LADAR in accordance with embodiments of the present disclosure. The optical detector 300 is employed as the detector array 126 in the system depicted in FIG. 1C. The optical detector 300 is formed by a two-dimensional M×N array of pixels. The optical detector 300 is a large format array having more than on the order of ten pixels in each direction and preferably having on the order of hundreds of pixels or more in each direction (e.g., a 512×512 or larger array). Each pixel within the optical detector 300 has a photosensitive material 301 receiving the sinusoidal return comprising return light and coherently interfering local oscillator light as described above in connection with FIGS. 1C and 2. The photosensitive material 301 for each pixel produces an analog output 303 received by a local processing circuit 304 for the respective pixel. Each local processing circuit 304 receives a local clock signal 305 and outputs four quadrature value signals 306 representing sampling of the analog output 303 at intervals during a single sample period. The local clock signal 305 is received from, and the quadrature signals 306 are provided to, a data bus 307 that operates under the control of one or more timing/control signals 308 and that outputs serialized digital representations of the quadrature signals 306 on a signal line 309 to a processor or computer 310. Processor/computer 310 (or at least portions thereof) may be formed on the same integrated circuit chip and/or packaged within the same integrated circuit package as the remainder of optical detector 300. Within the processor/computer 310, each of the quadrature signals is separately processed in the manner described above in connection with FIGS. 2 and 2A. The detector 300 thus applies ROIC technology to coherent detection, computing quadrature components $Q_0$, $Q_1$, $Q_2$, $Q_3$ of a single interfering frequency (IF) component or optionally a small number of IF components. The quadrature components—and therefore the amplitude and phase—of the IF are computed at the sensor frame rate, allowing detection to be performed on a large format 2D detector.

It should be noted that, although quadrature components are described in the exemplary embodiment above, the number of samples captured during a clock sample period may be less (e.g., three) or more (e.g., five or greater) than four. The number of parallel signal lines 306 from the local processing circuit 304 for each pixel and the data bus 307 would naturally match the number of samples captured at intervals during a single sample period.

Applications of synchronous coherent optical detection for FM LADAR include real-time interferometry, velocity measurement, vibration sensing, two-wavelength 3D imaging, and wavefront sensing for atmospheric compensation. Synchronous coherent optical detection for FM LADAR enables 3D imaging at much longer ranges than AM systems, and is applicable to the gaming industry and virtual reality systems.

Figure 4:
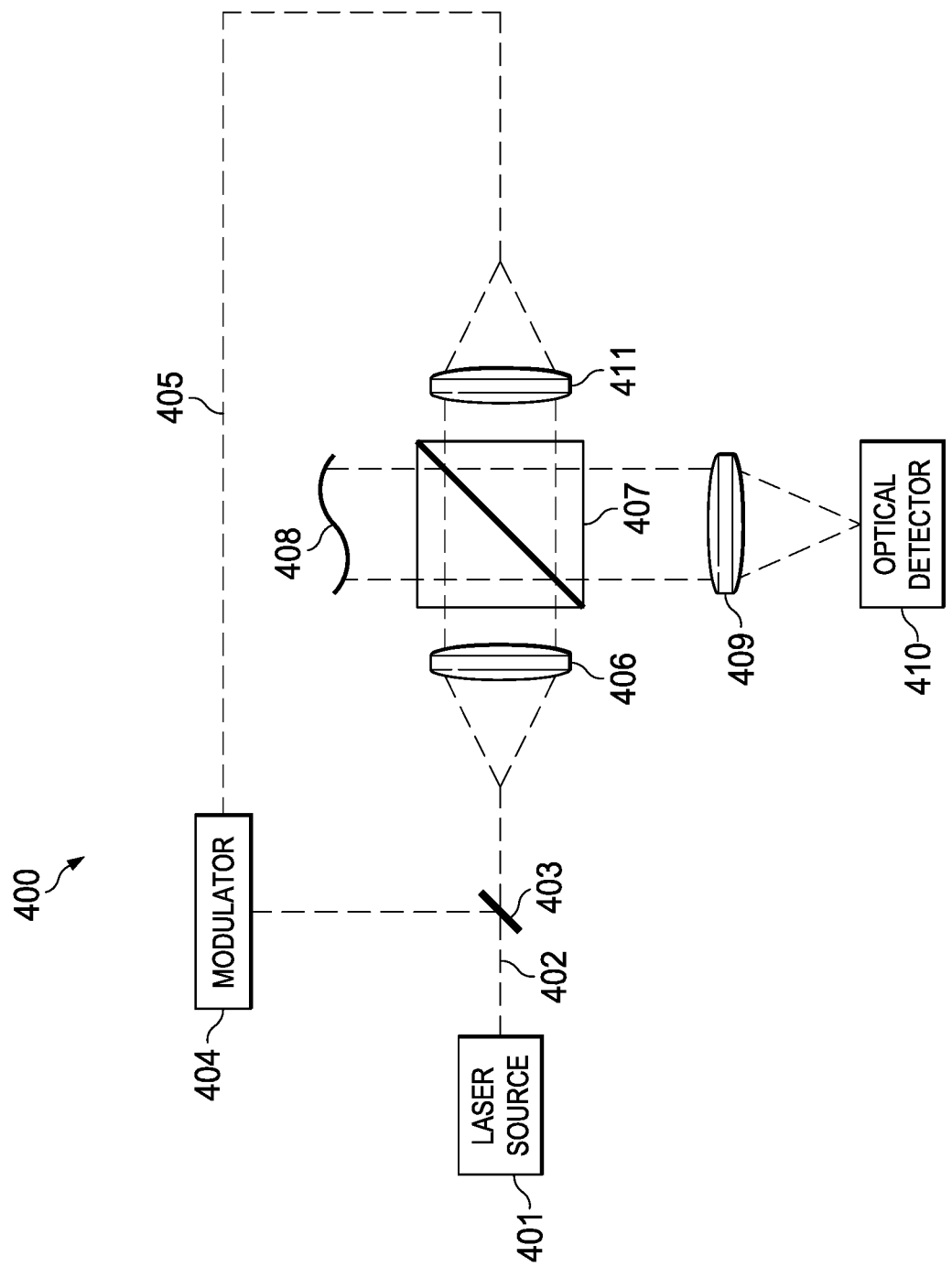
FIG. 4 illustrates use of synchronous coherent optical detection for FM LADAR for real-time interferometry in accordance with embodiments of the present disclosure.

FIG. 4 illustrates use of synchronous coherent optical detection for FM LADAR for real-time interferometry in accordance with embodiments of the present disclosure. For real-time interferometry, the phase data from coherent synchronous detection is equivalent to an interferogram, and quadrature detection is equivalent to phase-shifting interferometry. In the real-time interferometry system 400, an FM laser source 401 emits illumination 402 that is split by a beam splitter 403 such that a portion is received by a frequency modulator 404, which produces frequency modulated illumination 405 based on the emitted light 402. A remainder of the emitted light 402 passes through a lens 406 onto a half-silvered mirror 407 that reflects part of the light onto a test surface 408. Portions of the light reflecting off test surface 408 passes through mirror 407 and through lens 409 to impinge upon an optical detector 410 structured as depicted in FIG. 3. The reference light 405 passes through a lens 411 and reflects off half-silvered mirror 407, and then also passes through lens 409 to impinge upon the optical detector 410. In this implementation, the light reflected off test surface 408 and passing through mirror 407 to reach the optical detector 410 corresponds to the return light 124 reflected off the target 123 in FIG. 1C, while the reference light 405 reflected off the mirror 407 to reach the optical detector 410 corresponds to the local oscillator light 127. In this application, the high frame-rate capability of the optical detector 410 allows analysis of components in dynamic conditions. The phase difference between interferograms at different times allows determination of displacement, and therefore velocity measurement (since displacement per unit time is velocity), and measurement of velocity periodicity allows determination of vibration. The difference between phase measurements at two wavelengths (which may be recorded sequentially or, for an advanced synchronous detector, on two interference frequencies) provides 3D imaging.

For turbulence compensation, coherent synchronous detection also allows real-time recording of complex-values images, to which a sharpness algorithm may be used to determine atmospheric phase error to produce a turbulence-corrected image or to determine the correction to be applied to pre-compensate a high-energy laser. Additional details of turbulence correction may be found in J. C. Marron, et at., "Atmospheric turbulence correction using digital holographic detection: experimental results," *Optics Express*, 17, 11638-11651 (2009).

For digital holography, conventional detector arrays employ long pulse illumination with zero interference frequency. The static fringe pattern recorded represents coherent information recorded on a spatial carrier frequency. Synchronous coherent detection can operate at Q=1 rather than Q=2.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A laser detection and ranging (LADAR) system, comprising:
    an array of detector elements, each detector element within the array including a photosensitive material configured to receive return light reflected from a target and oscillating local light and to generate a signal to be sampled during each sample period clock cycle;
    a data bus coupled to the detector elements, the data bus configured to receive multiple samples of each signal generated by the detector elements for each sample period clock cycle; and
    a processor coupled to the data bus and configured to receive, from the data bus, the samples from the detector elements and to determine an amplitude and a phase for an interfering frequency corresponding to interference between the return light and the oscillating local light using the samples.

2. The system according to claim 1, wherein the array of detector elements is a two-dimensional array and comprises a large format array.

3. The system according to claim 1, wherein:
    the samples are quadrature components for each sample period clock cycle; and
    the processor is configured to employ the quadrature components to determine an amplitude and a phase for each of a plurality of interfering frequencies corresponding to interference between the return light and the oscillating local light.

4. The system according to claim 1, wherein each detector element within the array includes sample component signal line connections to the data bus.

5. The system according to claim 1, wherein each detector element within the array is configured to receive a clock signal from the data bus.

6. The system according to claim 1, wherein the data bus is configured to serialize the samples from the detector elements for each sample period clock cycle for transmission to the processor.

7. The system according to claim 1, wherein the array of detector elements and the data bus are contained within a read-out integrated circuit (ROTC).

8. The system according to claim 1, further comprising:
    a laser source configured to emit both light illuminating the target and the oscillating local light; and
    an imaging telescope configured to be positioned between the target and the array of detector elements and configured to focus the return light reflected from the target onto the array of detector elements.

9. The system according to claim 8, wherein the laser source comprises:
    a master oscillator;
    a first frequency modulator configured to modulate a frequency of a signal output by the master oscillator to generate a first signal, the emitted light based on the first signal; and
    a second frequency modulator configured to modulate the frequency of the signal output by the master oscillator to generate a second signal, the oscillating local light based on the second signal.

10. A laser detection and ranging (LADAR) system, comprising:
    an array of detector elements, each detector element within the array including a photosensitive material configured to receive return light reflected from a target and oscillating local light and to generate a signal to be sampled during each sample period clock cycle;
    a data bus coupled to the detector elements and configured to receive samples from the detector elements for each sample period clock cycle;
    a processor coupled to the data bus and configured to receive, from the data bus, the samples from the detector elements and to determine an amplitude and a phase for an interfering frequency corresponding to interference between the return light and the oscillating local light using the samples; and
    a laser source configured to emit both light illuminating the target and the oscillating local light, wherein the laser source comprises:
        a master oscillator;
        a first frequency modulator configured to modulate a frequency of a signal output by the master oscillator to generate a first signal;
        a second frequency modulator configured to modulate the frequency of the signal output by the master oscillator to generate a second signal;
        an amplifier configured to amplify the first signal and generate the light illuminating the target; and
        a local oscillator configured to respond to the second signal and generate the oscillating local light.

11. A laser detection and ranging (LADAR) method, comprising:
    receiving, at an array of detector elements, return light reflected from a target, each detector element within the array including a photosensitive material configured to receive the return light reflected from the target and oscillating local light and to generate a signal to be sampled during each sample period clock cycle;
    receiving, on a data bus coupled to the detector elements, multiple samples of each signal generated by the detector elements for each sample period clock cycle;
    transmitting, to a processor coupled to the data bus, the samples from the detector elements for each sample period clock cycle; and
    determining, with the processor, an amplitude and a phase for an interfering frequency corresponding to interference between the return light and the oscillating local light using the samples.

12. The method according to claim 11, wherein the array of detector elements is a two-dimensional array and comprises a large format array.

13. The method according to claim 11, wherein the samples comprise quadrature components for each sample period clock cycle, the method further comprising:
    employing the quadrature components to determine an amplitude and a phase for each of a plurality of interfering frequencies corresponding to interference between the return light and the oscillating local light.

14. The method according to claim 11, wherein each detector element within the array includes sample component signal line connections to the data bus.

15. The method according to claim 11, wherein each detector element within the array is configured to receive a clock signal from the data bus.

16. The method according to claim 11, further comprising:
serializing, in the data bus, the samples from each of the detector elements for each sample period clock cycle for transmission to the processor.

17. The method according to claim 11, wherein the array of detector elements and the data bus are contained within a read-out integrated circuit (ROTC).

18. The method according to claim 11, further comprising:
emitting both light illuminating the target and the oscillating local light from a laser source; and
positioning an imaging telescope between the target and the array of detector elements to focus the return light reflected from the target onto the array of detector elements.

19. The method according to claim 18, further comprising:
employing a first frequency modulator to modulate a frequency of a signal output by a master oscillator and generate a first signal, the emitted light based on the first signal; and
employing a second frequency modulator to modulate the frequency of the signal output by the master oscillator and generate a second signal, the oscillating local light based on the second signal.

20. A laser detection and ranging (LADAR) method, comprising:
emitting both light illuminating a target and oscillating local light from a laser source, which comprises:
employing a first frequency modulator to modulate a frequency of a signal output by a master oscillator and generate a first signal;
employing a second frequency modulator to modulate the frequency of the signal output by the master oscillator and generate a second signal;
amplifying the first signal to generate the light illuminating the target; and
receiving the second signal at a local oscillator that generates the oscillating local light;
receiving, at an array of detector elements, return light reflected from the target, each detector element within the array including a photosensitive material configured to receive the return light reflected from the target and the oscillating local light and to generate a signal to be sampled during each sample period clock cycle;
receiving, on a data bus coupled to the detector elements, samples from the detector elements for each sample period clock cycle;
transmitting, to a processor coupled to the data bus, the samples from the detector elements for each sample period clock cycle; and
determining, with the processor, an amplitude and a phase for an interfering frequency corresponding to interference between the return light and the oscillating local light using the samples.

* * * * *